US008904552B2

(12) United States Patent
Mo et al.

(10) Patent No.: US 8,904,552 B2
(45) Date of Patent: Dec. 2, 2014

(54) SYSTEM AND METHOD FOR PROTECTING DATA INFORMATION STORED IN STORAGE

(75) Inventors: Sang-Dok Mo, Suwon-si (KR); Sang-Bum Suh, Seoul (KR); Sung-Min Lee, Suwon-si (KR); Bok-Deuk Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1537 days.

(21) Appl. No.: 12/017,580

(22) Filed: Jan. 22, 2008

(65) Prior Publication Data

US 2008/0263676 A1   Oct. 23, 2008

Related U.S. Application Data

(60) Provisional application No. 60/912,216, filed on Apr. 17, 2007.

(30) Foreign Application Priority Data

Oct. 23, 2007 (KR) ........................ 10-2007-0106842

(51) Int. Cl.
G06F 21/00 (2013.01)
H04L 29/06 (2006.01)
G06F 21/62 (2013.01)
G06F 9/46 (2006.01)
G06F 21/57 (2013.01)

(52) U.S. Cl.
CPC .............. G06F 21/575 (2013.01); G06F 21/57 (2013.01); G06F 21/62 (2013.01)
USPC .............................. 726/28; 711/164; 709/310

(58) Field of Classification Search
USPC ............................... 726/28; 711/164; 709/310
See application file for complete search history.

(56) References Cited

U.S. PATENT DOCUMENTS

| 7,689,817 | B2 * | 3/2010 | Zimmer et al. .................... 713/1 |
| 2002/0129172 | A1 | 9/2002 | Baskey et al. |
| 2002/0194389 | A1 * | 12/2002 | Worley et al. ................. 709/310 |
| 2006/0136694 | A1 * | 6/2006 | Hasbun et al. ................ 711/173 |
| 2006/0236122 | A1 * | 10/2006 | Field et al. ..................... 713/187 |
| 2010/0011200 | A1 * | 1/2010 | Rosenan ........................... 713/2 |
| 2013/0067184 | A1 * | 3/2013 | Robinson et al. ............. 711/164 |

FOREIGN PATENT DOCUMENTS

| KR | 10-2004-0004554 A | 1/2004 |
| KR | 10-2006-0102584 A | 9/2006 |
| WO | WO 03027835 A3 * | 7/2004 |

OTHER PUBLICATIONS

Barham (Barham et al., "Xen and the Art of Virtualization", SOSP Oct. 2003, ACM 1-58113-757-5/03/0010).*
Liu (Liu et al. "High Performance VMM-Bypass I/O in virtual Machines", In Proceedings of the 2006 USENIX Annual Technical Conference, May 2006).*

(Continued)

*Primary Examiner* — Andrew Nalven
*Assistant Examiner* — Courtney Fields
(74) *Attorney, Agent, or Firm* — Sughrue Mion, PLLC

(57) ABSTRACT

A system and method are provided for protecting data information stored in a storage medium. The system includes a memory unit which is divided into a plurality of storage regions in which data information is stored; a domain unit which includes a plurality of OS domains, which are access subjects, and loads the data information stored in the storage regions that are accessed by the OS domains; and a control unit which controls access of the domain unit to the memory unit.

19 Claims, 8 Drawing Sheets

(56) References Cited

OTHER PUBLICATIONS

Olzak (Tom Olzak, "Secure hypervisor-based virtual server environments", Feb. 2007, found at http://www.techrepublic.com/blog/security/secure-hypervisor-based-virtual-server-environments/160).*

Fraser (Fraser et al., "Safe hardware access with the Xen virtual machine monitor", in 1st Workshop on Operating System and Architectural Support for the on demand IT InfraStructure (OASIS), 2004).*

King (King et al., "Operating System Support for Virtual Machines", Proceedings of the 2003 USENIX Technical Conference, 2003).*

Tupakula, U. ; Varadharajan, V. ; Dutta, D.; "Intrusion detection techniques for virtual domains"; High Performance Computing (HiPC), 2012 19th International Conference on DOI: 10.1109/HiPC.2012.6507491; Publication Year: Dec. 2012 , pp. 1-9.*

Communication dated Jan. 27, 2014 issued by the Korean Intellectual Property Office in counterpart Korean Application No. 10-2007-0106842.

* cited by examiner

SYSTEM AND METHOD FOR PROTECTING DATA INFORMATION STORED IN STORAGE

CROSS REFERENCE TO RELATED APPLICATION

This application claims priority from U.S. Provisional Application No. 60/912,216 filed on Apr. 17, 2007 in the United States Patent and Trademark Office, and Korean Patent Application No. 10-2007-0106842 filed on Oct. 23, 2007 in the Korean Intellectual Property Office, the disclosures of which are incorporated herein by reference in their entirety.

BACKGROUND OF THE INVENTION

1. Field of the Invention

Apparatuses and methods consistent with the present invention relates to protecting information stored in a storage medium, such as a flash memory, and more particularly, to protecting important data information stored in a storage from an unauthorized access.

2. Description of the Related Art

In general, personal computers, personal digital assistants (PDAs), wireless terminals, and digital televisions (DTVs) can use a virtualization technology to ensure security and to provide various applications and services. In the virtualization technology, functions, such as secure booting, secure software, and access control, are needed to provide a secure environment. As a core technology for providing these functions, a storage security system for protecting important data information stored in a storage medium, such as a hard disk or a flash memory, from an unauthorized access and for limiting the use of the storage by different users has been developed.

FIG. 1 is a block diagram illustrating the structure of a system for protecting data information stored in a storage medium according to the related art, and FIG. 2 is a diagram schematically illustrating an information access restricting region of the data-information protecting system according to the related art.

As shown in FIGS. 1 and 2, the system includes a driver/control domain 31 that can directly access a memory (storage) 20 and a general domain 32 that can access the memory 20 through the driver/control domain 31, in an environment using a virtual machine monitor (VMM) 10.

The driver/control domain 31 can access both a driver/control domain using region (a) and a general domain using region (b), and the general domain 32 can access only the general domain using the region (b).

However, in the system, the different setting of the access regions enables the driver/control domain 31 to access a kernel stored in the general domain using region (b) as well as important information data, such as the VMM 10, a security key, and a driver/control domain kernel, which results in weak protection of important information stored in the storage.

In order to perform security booting, it is necessary to check whether the hardware, the VMM 10, and the kernel are changed in this order. However, since the VMM 10, the kernel, and the boot loader are exposed to general users or viruses, they are likely to be changed, thus making it difficult to perform secure booting for ensuring a secure environment.

Further, in the related art, there is a risk that important information data codes will be changed due to malicious software such as a virus. That is, when all the data, such as the kernel, a device driver, security policies, and a master key, is exposed to general users, the data is likely to be changed due to virus. For example, if a keyboard driver is changed due to a virus, data input by the user, for example, an identifier (ID) or a password, may be transmitted to other persons.

Furthermore, an unauthorized user may change commercial codes or data, such as digital rights management (DRM). That is, the unauthorized user can easily access all the data, such as the VMM 10, the security policies, and the master key, and acquire data to be protected by, for example, DRM using a crack program, which may also have an adverse effect on commercial service providers, such as MP3 service providers.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Aspects of the present invention provide a system and method for protecting important data information stored in a storage medium from an unauthorized access, in an environment in which many users can access data information stored in the storage.

According to an aspect of the present invention, there is provided a system for protecting data information stored in a storage medium, the system including: a memory unit divided into a plurality of storage regions to store various data information items according to their types, important data information being stored in a predetermined storage region; a domain unit including a plurality of operating system (OS) domains, which are access subjects, and loading the data information stored in the storage regions that are accessed by the OS domains; and a control unit controlling the access of the domain unit to the memory unit.

According to another aspect of the present invention, there is provided a method of protecting data information stored in a storage medium, the method including: dividing a memory unit into a plurality of storage regions in order to store various encoded data information items according to their types; dividing a domain unit into a plurality of OS domains such that various access subjects to the data information stored in the memory unit are formed; and controlling each of the OS domains to access a storage region allocated thereto in the memory unit and to load data information.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
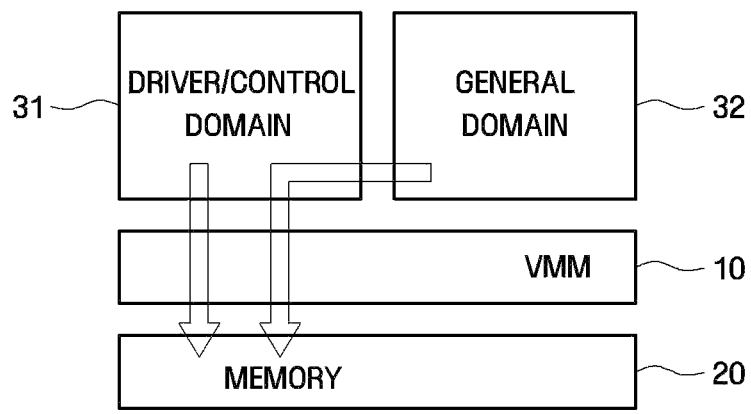
FIG. 1 is a block diagram illustrating the structure of a system for protecting data information stored in a storage medium according to the related art.
Figure 2:
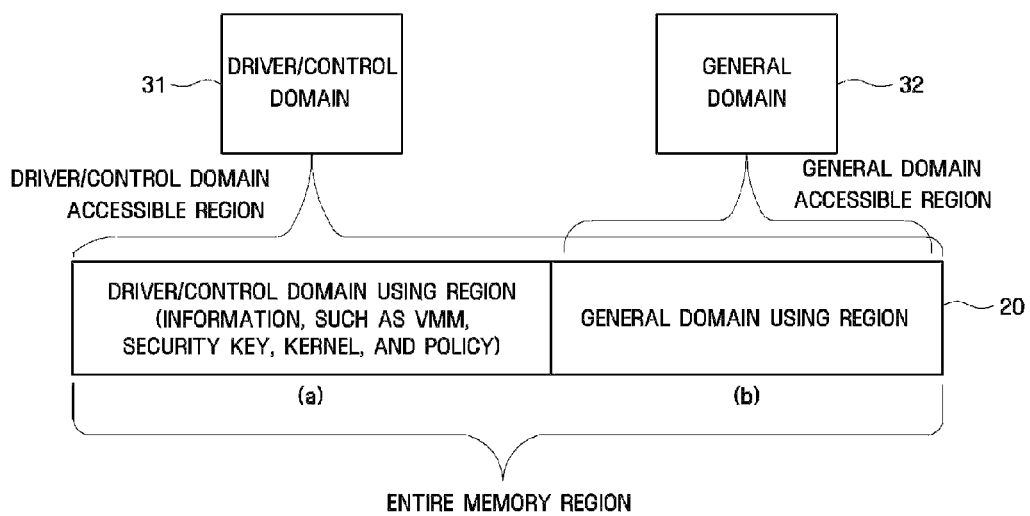
FIG. 2 is a diagram schematically illustrating an information access limiting region of the system according to the related art.

The various aspects and features of the present invention and methods of accomplishing the same may be understood more readily by reference to the following detailed description of exemplary preferred embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

Hereinafter, a system and method for protecting data information stored in a storage medium according to exemplary embodiments of the present invention will be described in detail with reference to the accompanying drawings. In the following description, a detailed description of known functions and configurations incorporated herein has been omitted for clarity and conciseness.

Figure 3:
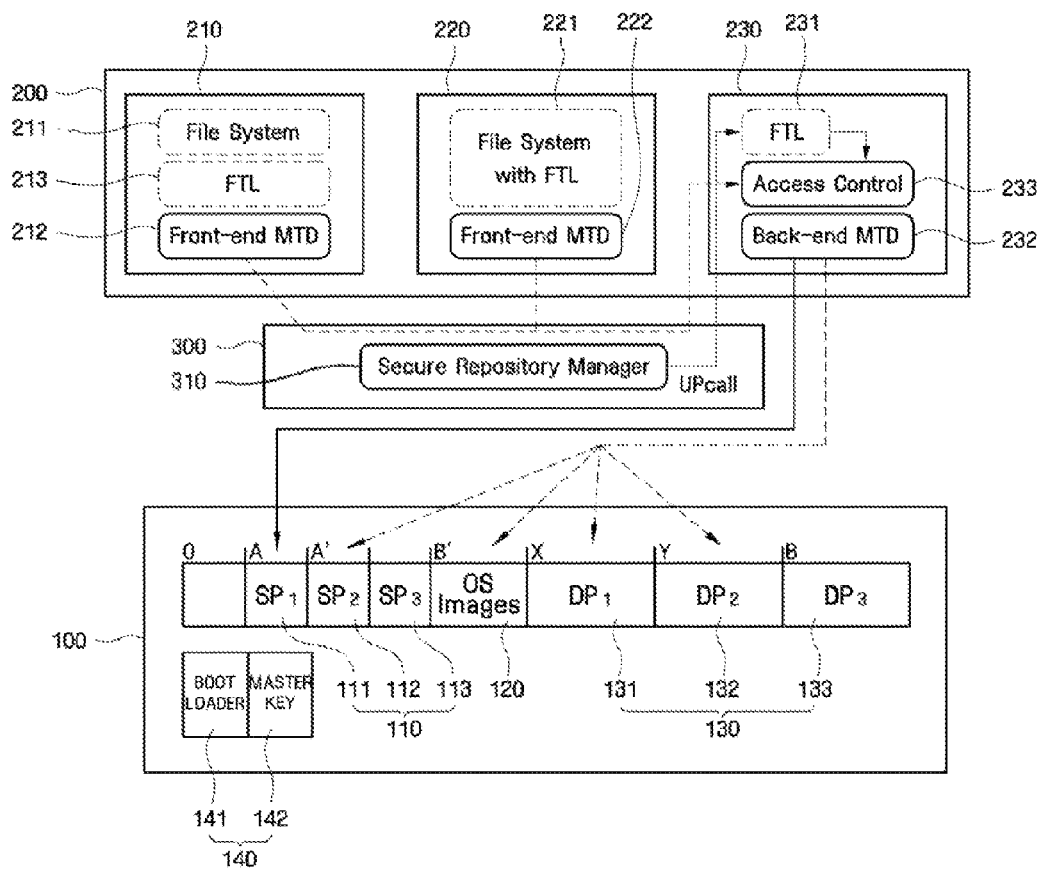
FIG. 3 is a block diagram illustrating the structure of a system for protecting data information stored in a storage medium, according to an exemplary embodiment of the invention.
Figure 4:
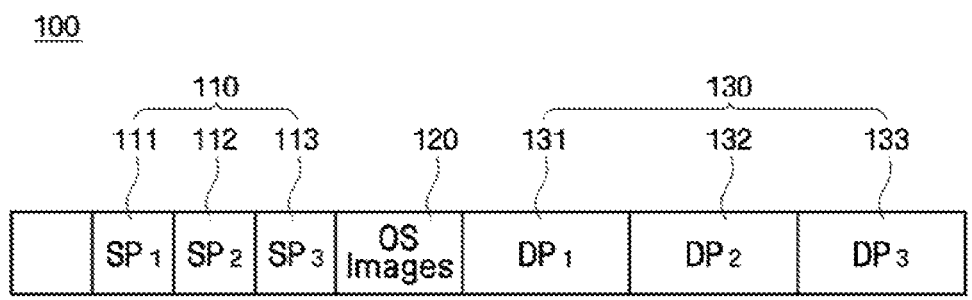
FIG. 4 is a diagram illustrating divided storage regions of a memory unit in the system shown in FIG. 3.
Figure 5:
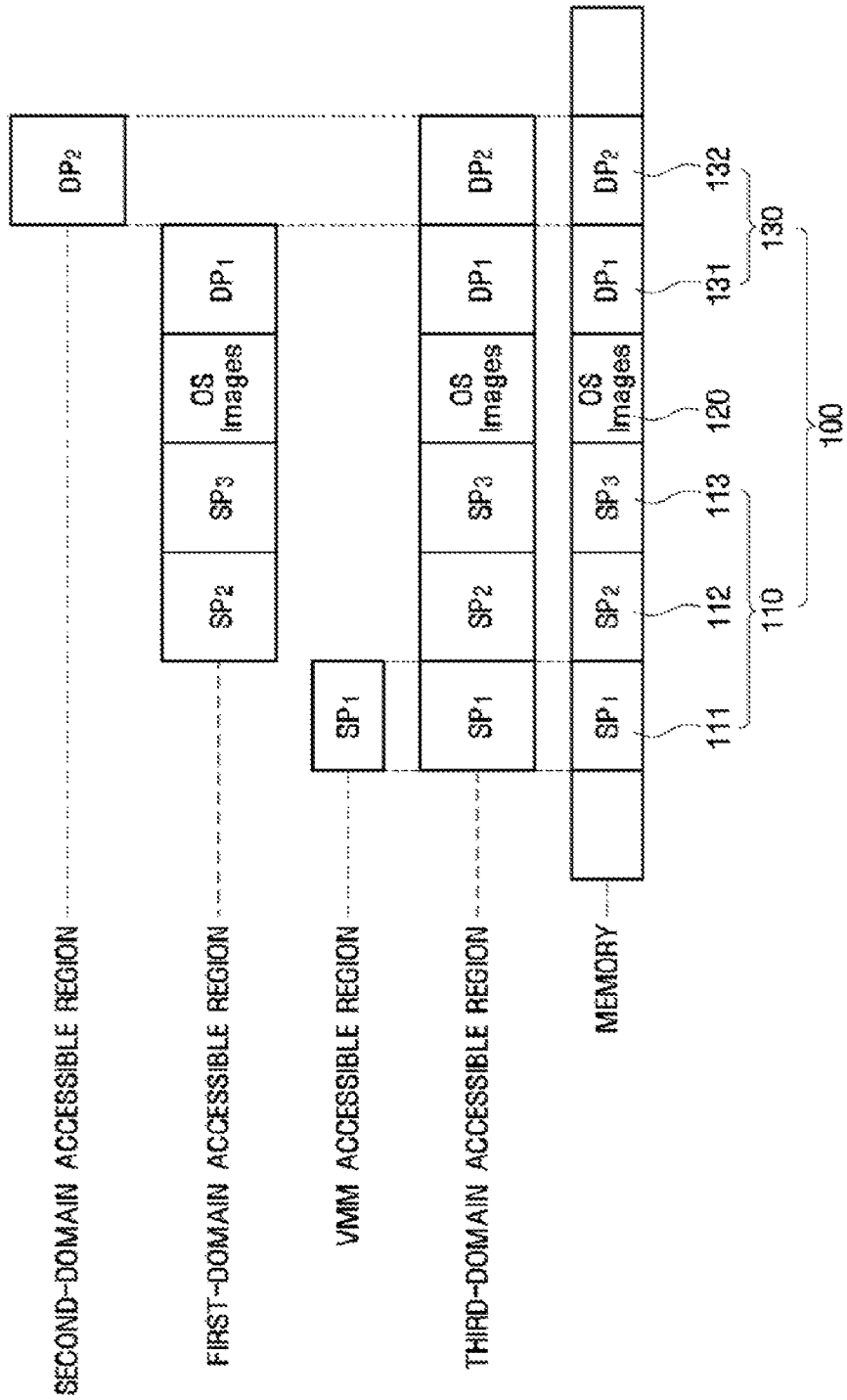
FIG. 5 is a diagram illustrating the storage regions of the memory unit that can be accessed by OS domains, which are access subjects, in the system shown in FIG. 3.

FIG. 3 is a block diagram illustrating a system for protecting data information in a storage medium, according to an exemplary embodiment of the present invention. FIG. 4 is a diagram illustrating divided storage regions of a memory unit in the data-information protecting system shown in FIG. 3. FIG. 5 is a diagram illustrating the storage regions of a memory unit that can be accessed by OS domains, which are access subjects, in the data-information protecting system shown in FIG. 3.

As show in FIGS. 3 to 5, the data-information protecting system includes a memory unit 100, a domain unit 200, and a control unit 300.

The memory unit 100 is a storage medium for storing data information. The memory unit 100 is divided into a plurality of storage regions to store various data information items according to the type and security level thereof, and encoded data information is stored in a predetermined one of the storage regions.

The memory unit 100 includes first, second, third, and fourth memory regions 110, 120, 130, and 140. The memory unit 100 is a non-volatile memory. Specifically, the first, second, and third memory regions 110, 120, and 130 are flash memories, and the fourth memory region 140 is a read only memory (ROM). That is, the first, second, and third memory regions 110, 120, and 130 can be accessed and updated by an authenticated system, and the fourth memory region 140 cannot be changed by a user or a system without authorization.

The first memory region 110 stores encoded data information required for security. The encoded data information includes data required for integrity and confidentiality, such as a certificate of authentication of system manufacturer, electronic signature values for images including a VMM image, and a security key, and is encoded by a master key 142 stored in the fourth memory region 140. More specifically, the first memory region 110 includes a first security region (SP1) 111 that stores encoded data information of a certificate of authentication of a system manufacturer and electronic signature values for a VMM image and an OS kernel image; a second security region (SP2) 112 that stores encoded data information of system policies that are used for the control unit 300 to perform access control, and a third security region (SP3) 113 that stores encoded data information of a security key that is used by a first domain 210, which will be described later. The first memory region 110 needs to ensure confidentiality and integrity and minimize an overhead due to frequent changes, and it can be accessed by only an authorized user, a VMM authority. Data information stored in one region of the first memory region 110 is encoded by the master key 142 stored in another region of the first memory region 110 or in the fourth memory region 140. The encoded data information stored in the first memory region 110 is updated in real time by the control unit 300.

The second memory region 120 stores OS image data information items of first, second, and third domains 210, 220, and 230, which will be described later. The second memory region 120 also stores kernel images for booting the first, second, and third domains 210, 220, and 230. The second memory region 120 needs to ensure the integrity for the OS images of the first, second, and third domains 210, 220, and 230, and can be accessed by an authorized user, a VMM authority, an authority for the first domain 210.

The third memory region 130 includes storage regions (DP1, DP2, and DP3) 131, 132, and 133 that store specific data information required to perform the first, second and third domains 210, 220, and 230.

The fourth memory region 140 stores basic data information required for system booting and information security. The fourth memory region 140 stores data information of a boot loader 141 and the master key 142. The fourth memory region 140 needs to prevent unauthorized change of data information by software and hardware components and to block an unauthorized access by the software and hardware components. The authenticated boot loader needs to include at least verified codes from the viewpoint of a function.

The domain unit 200 includes a plurality of OS domains, which are access subjects, and loads data information of the storage regions in the memory unit 100 that can be accessed by the OS domains. In this exemplary embodiment, the domain is an environment in which each OS domain operates.

The domain unit 200 includes the first, second, and third domains 210, 220, and 230, and the domains 210, 220, and 230 can access only the storage regions allocated thereto in the memory unit 100. This access limit may be controlled according to a system policy.

Specifically, the first domain 210 is allowed to download only authenticated software from an authenticated Internet server and to install and execute the downloaded software. The first domain 210 includes a file system 211 that does not include an Flash Translation Layer (FTL), such as a file allocation table (FAT) file system, a front-end Memory Technology Driver (MTD) 212, and an FTL 213 that can access only the region allocated to the front-end MTD 212 and a flash driver used by the first domain 210. The first domain 210 updates various security policies and kernel images, and can access data information stored in the second security region 112 and the third security region 113 of the first memory region 110, the second memory region 120, and a storage region 131 allocated to the first domain 210 of the third memory region 130.

The second domain 220 is allowed to download any software from a general Internet server and to install and execute the downloaded software. The second domain 220 includes a file system 221 including an FTL, such as JFFS2 used by a Linux system, and a front-end MTD 222. The front-end MTDs 212 and 222 of the first and second domains 210 and 220 provide the regions allocated by a back-end MTD 232 of the third domain 230 to the first and second domains 210 and 220, respectively. The second domain 220 can access data information stored in the storage region 132 that is allocated to the second domain 220 in the third memory region 130.

The third domain 230 uses a VMM to allow the first and second domains 210 and 220 to access data information stored in the regions allocated thereto in the memory unit 100, and manages hardware apparatus drivers. The third domain 230 includes an FTL 231 that protects the VMM from an unstable operation of the flash driver that is frequently updated in the third domain 230 and reduces the size of the VMM, a back-end MTD 232 that divides the memory unit 100 and controls read/write/erase operations, and an access control 233 that controls access to the regions allocated by the back-end MTD 232. The third domain 230 performs an update (read and write) operation, and can access all of the data information stored in the first, second, and third memory regions 110, 120, and 130.

The control unit 300 includes the VMM which controls the domain unit 200 to access the memory unit 100. The control unit 300 includes a secure repository manager 310 that manages data stored in the first memory region 110 and upcalls the FTL 231 of the third domain 230 to access the first memory region 110. The secure repository manager 310 can use the VMM to access data information stored in the first security region 111 of the first memory region 110.

Next, a method of protecting data information stored in a storage medium, according to an exemplary embodiment of the present invention will be described in detail with reference to FIGS. 6 to 8.

Figure 6:
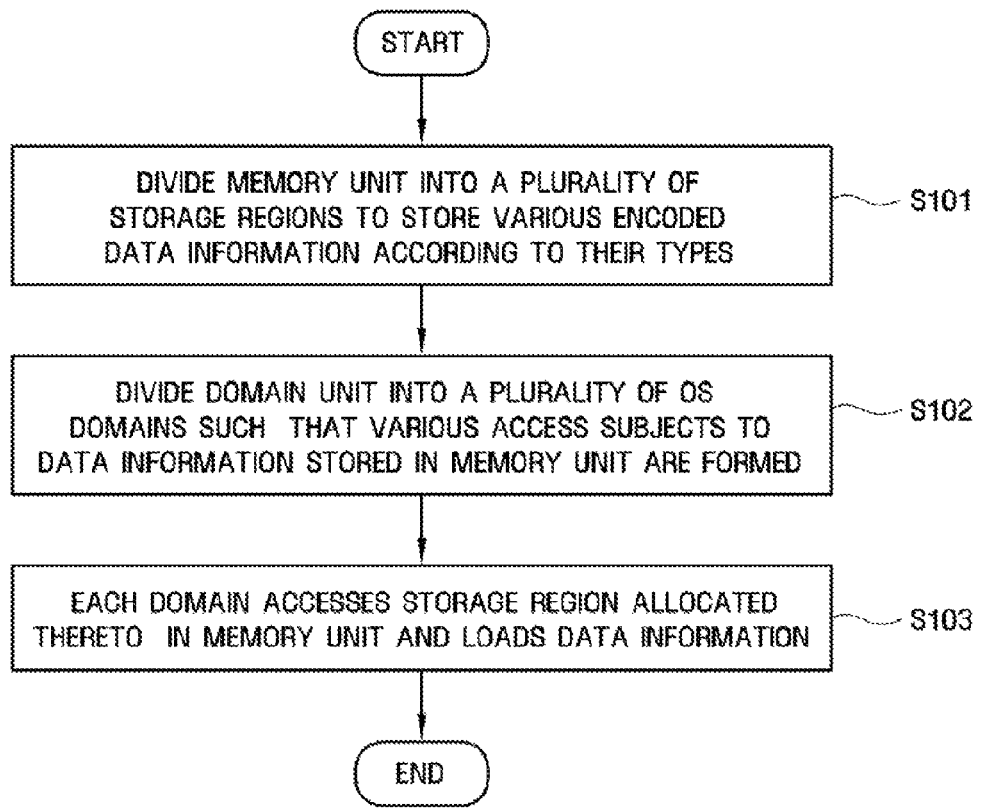
FIG. 6 is a flowchart illustrating a method of protecting data information stored in a storage medium, according to an exemplary embodiment of the invention.

FIG. 6 is a flowchart illustrating a method of protecting data information stored in a storage medium, according to an exemplary embodiment of the present invention.

As shown in FIG. 6, in the data information protecting method, the memory unit 100 is divided into a plurality of storage regions in order to store various encoded data information (S101). Specifically, the memory unit 100 is divided into the first memory region 110 that stores encoded data information required for security, the second memory region 120 that stores OS image data information of the domains 210, 220, and 230, the third memory region 130 that stores data information required to execute the domains 210, 220, and 230, and the fourth memory region 140 that stores basic data information required for system booting and information security. Then, the domain unit 200 is divided into a plurality of OS domains such that various access subjects to data information in the memory unit 100 are formed (S102). More specifically, the domain unit 200 is divided into the first domain 210 that provides an OS capable of installing and executing authenticated security software, the second domain 220 the provides an OS capable of installing and executing general software, and the third domain 230 that provides an OS for allowing the first and second domains 210 and 220 to access the storage regions allocated thereto in the memory unit 100. Then, the domains 210, 220, and 230 access the memory regions allocated thereto in the memory unit 100 and load data information (S103). Specifically, the first domain 210 accesses data information stored in a storage region allocated to the first domain 210 among the first, second, and third memory regions 110, 120, and 130, and the second domain 220 accesses data information stored in a storage region allocated thereto in the third memory region 130. In addition, the third domain 230 accesses data information stored in all of the storage regions of the first, second and third memory regions 110, 120, and 130 and loads the data information.

That is, in this exemplary embodiment, in an environment in which there are various access subjects that use the VMM to access data information stored in a storage medium, such as a flash memory, an authorized user is allowed to access necessary information stored in the storage, but an unauthorized user is not allowed to access the data information. In this way, it is possible to protect important data information, such as a master key, a VMM, a kernel, and a security policy, from an unauthorized user or a malicious virus.

Figure 7:
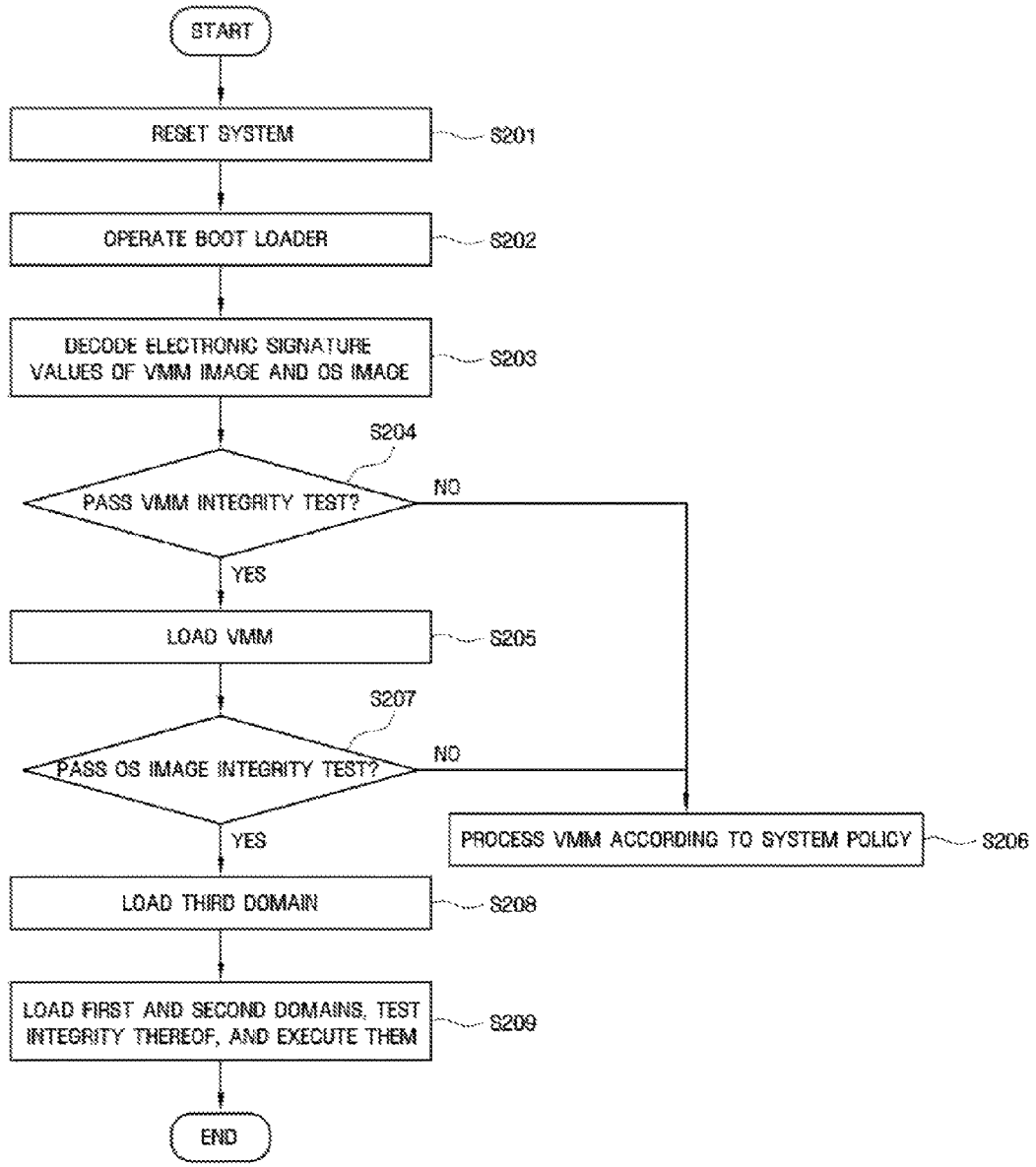
FIG. 7 is a flowchart illustrating a method of initializing a system for protecting data information stored in a storage medium, according to an exemplary embodiment of the invention.

FIG. 7 is a flowchart illustrating a method of initializing a system for protecting data information stored in a storage medium, according to an exemplary embodiment of the present invention.

As shown in FIG. 7, in the method of initializing a system for protecting data information stored in a storage medium, when the system is reset (S201), the boot loader 141 of the fourth memory region 140 operates (S202). Then, the boot loader 141 decodes electronic signature values of a VMM image and an OS image and loads the decoded values to the memory unit 100 (S203). Then, the boot loader 141 uses the decoded electronic signature values of the VMM image and the OS image to check whether the VMM is changed, that is, to test the integrity of the VMM (S204). Subsequently, if it is determined that the VMM passes the integrity test, the boot loader loads the VMM (S205). On the other hand, if it is determined that the VMM does not pass the integrity test, the boot loader performs a process according to a predetermined system policy (S206). Then, the VMM examines the integrity of the OS image (S207). If the OS image passes the integrity test, the VMM operates the third domain 230 (S208). Then, the VMM loads the first and second domains 210 and 220 to the memory unit 100, test the integrity thereof, and executes them (S209). On the other hand, if the OS image does not pass the integrity test, the boot loader performs a process according to a predetermined system policy (S206).

Figure 8:
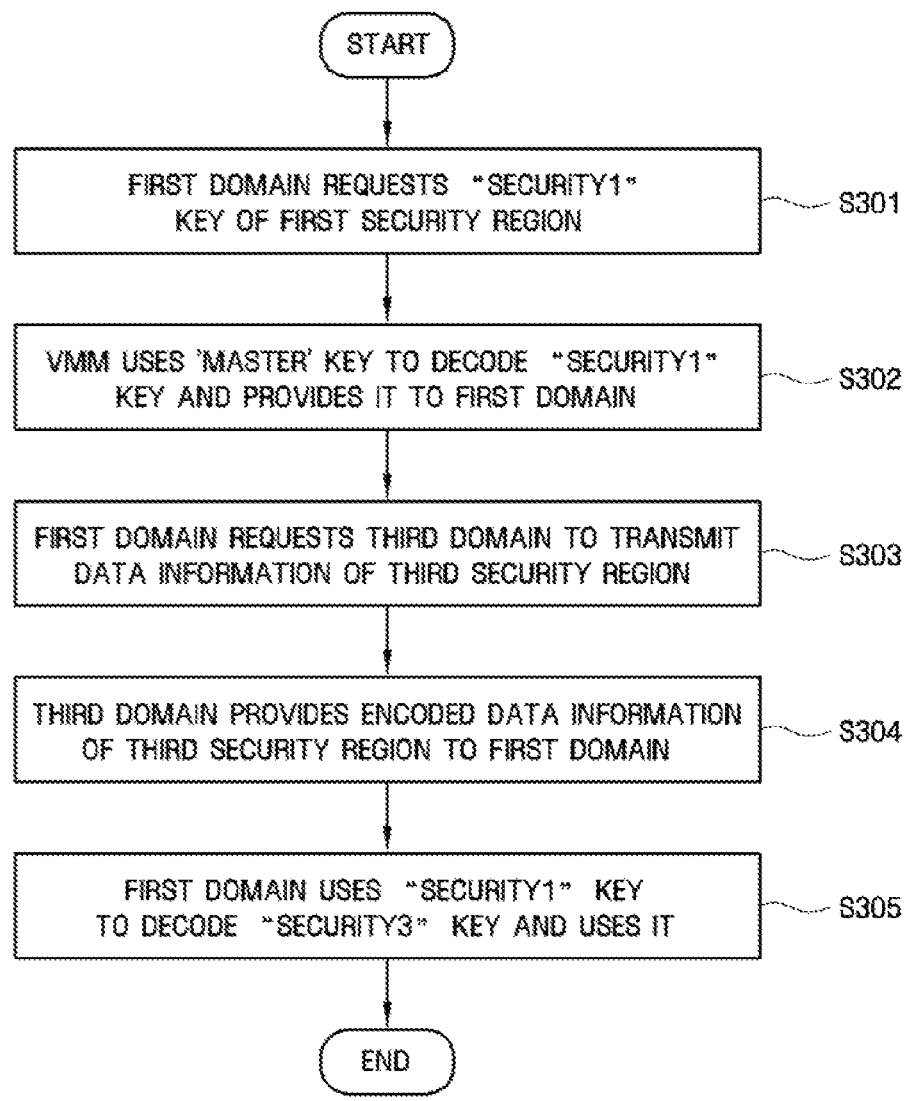
FIG. 8 is a flowchart illustrating an example of the operation of a first domain loading a security key of a third security region of a first memory region in the system of FIG. 7.

FIG. 8 is a flowchart illustrating an example of the operation of the first domain loading a security key of the third security region of the first memory region in the data-information protecting system of the present invention.

As shown in FIG. 8, first, the first domain 210 requests a "security1 key" of the first security region 111 (S301). Then, the control unit 300 uses a "master key" to decode the "security1 key", and provides the decoded key to the first domain 210 (S302). Subsequently, the first domain 210 requests the third domain 230 to transmit data information of the third security region 113 (S303), and provides encoded data information of the third security region 113 to the first domain 210 (S304). Then, the first domain 210 uses the "security1 key" to decode a "security3 key" and uses the decoded key (S305).

The apparatus and method for protecting data information stored in a storage medium, according to the exemplary embodiments of the present invention, may have the following effects.

First, in an environment in which many users can access information stored in a storage medium, each user is allowed to access a storage region allocated thereto in the storage, which makes it possible to protect important data information stored in the storage from an unauthorized access.

Second, it is possible to prevent data codes of important data information from being changed due to an unauthorized access, and thus ensure the security of data information stored in a storage medium.

Third, it is possible to provide security booting to protect data information stored in a storage medium, thereby establishing a secure environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for protecting stored data information, the system comprising:
    a memory unit which is divided into a plurality of storage regions in which data information is stored and encoded data information required for security is stored in a predetermined one of the plurality of storage regions;
    a domain unit which comprises a plurality of operating system (OS) domains, which are access subjects, and loads the data information stored in the storage regions that are accessed by the OS domains; and
    a control unit which controls access of the domain unit to the memory unit,
    wherein at least two storage regions from the storage regions are allocated to different ones of the OS domains,
    wherein the control unit comprises a virtual machine monitor to perform the control process,
    wherein the domain unit comprises:
    a first domain which provides an OS for installing and executing authenticated security software;
    a second domain which provides an OS for installing and executing general software; and
    a third domain which provides an OS that enables the first and second domains to access the storage regions allocated to the first and second domains in the memory unit.

2. The system of claim 1, wherein the first and second domains access data information stored in the storage regions of the memory unit through the third domain.

3. The system of claim 1, wherein the memory unit is a non-volatile memory.

4. The system of claim 1, wherein the memory unit comprises:
    a first memory region which stores encoded data information required for security;
    a second memory region which stores OS image data information of the OS domains;
    a third memory region which stores data information required to execute the OS domains; and
    a fourth memory region which stores basic data information required for system booting and information security.

5. The system of claim 4, wherein the first memory region comprises:
    a first security region which stores encoded data information of a certificate of authentication of system manufacturer and electronic signature values of a virtual machine monitor image and an OS kernel image;
    a second security region which stores encoded data information of system policies that are used by the control unit to perform access control; and
    a third security region which stores encoded data information of a security key that is used by the first domain.

6. The system of claim 4, wherein data information stored in one region of the first memory region is encoded by a master key stored in another region of the first memory region or in the fourth memory region.

7. The system of claim 4, wherein the encoded data information stored in the first memory region is updated in real time by the control unit.

8. The system of claim 4, wherein the second memory region stores kernel images for booting the OS domains.

9. The system of claim 4, wherein the fourth memory region stores data information of a boot loader and a master key.

10. The system of claim 5, wherein the first domain accesses data information stored in the storage regions, among the second security region and third security region of the first memory region, the second memory region, and the third memory region.

11. The system of claim 5, wherein the second domain accesses a storage region of the third memory region.

12. The system of claim 5, wherein the third domain accesses all the data information stored in the first, second, and third memory regions.

13. The system of claim 5, wherein the control unit uses a virtual machine monitor to access data information stored in the first security region of the first memory region.

14. A method of protecting stored data information, the method comprising:
    dividing a memory unit into a plurality of storage regions in which data information is stored and storing encoded data information required for security in a predetermined one of the plurality of storage regions;
    dividing a domain unit into a plurality of operating systems (OS) domains such that access subjects to the data information stored in the memory unit are formed; and
    controlling each of the OS domains to access a storage region allocated thereto in the memory unit and to load data information,
    wherein at least two of the storage regions are allocated to different ones of the OS domains,
    wherein the dividing of the memory unit comprises:
    dividing the memory unit into a first memory region which stores encoded data information required for security, a second memory region which stores OS image data information of the OS domains, a third memory region which stores data information required to execute the OS domains, and a fourth memory region which stores basic data information required for system booting and information security,
    wherein the dividing the domain unit comprises:
    dividing the domain unit into a first domain that provides an OS for installing and executing authenticated security software, a second domain that provides an OS for installing and executing general software, and a third domain providing an OS that enables the first and second domains to access the storage regions in the memory unit.

15. The method of claim 14, wherein in the controlling each of the OS domains to access the storage region:
    the first domain accesses data information stored in storage regions allocated thereto, among the first, second, and third memory regions;
    the second domain accesses data information stored in a storage region allocated thereto in the third memory region; and
    the third domain accesses data information stored in all of the storage regions of the first, second, and third memory regions.

16. The method of claim 15, further comprising initializing a system for protecting data information stored in the memory unit.

17. The method of claim 16, wherein the initializing of the system comprises:
- operating a boot loader of the fourth memory region when the system is reset;
- controlling the boot loader to decode electronic signature values of a virtual machine monitor (VMM) image and an OS image and to load the decoded values to the memory unit;
- controlling the boot loader to use the decoded electronic signature values of the VMM image and the OS image to check whether a VMM is changed;
- determining whether the VMM passes an integrity test;
- loading and operating the VMM if it is determined that the VMM passes the integrity test, and processing the VMM according to a predetermined system policy if it is determined that the VMM does not pass the integrity test;
- controlling the VMM to determine whether the OS image passes an integrity test; and
- operating the third domain when the OS image passes the integrity test.

18. The method of claim 17, wherein the initializing of the system further comprises controlling the VMM to load the first and second domains to the memory unit, examine the integrity of the first and second domains, and execute the first and second domains.

19. The system of claim 1, wherein the control unit further comprises a secure repository manager, and the secure repository manager accesses data information stored in the storage regions of the memory unit through the third domain.

* * * * *